US006286414B1

(12) United States Patent
Kruse

(10) Patent No.: US 6,286,414 B1
(45) Date of Patent: Sep. 11, 2001

(54) COMPACT ONE PIECE COOLED PISTON AND METHOD

(75) Inventor: Brian K. Kruse, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/375,322

(22) Filed: Aug. 16, 1999

(51) Int. Cl.[7] ..... F01B 31/08; F16J 1/04
(52) U.S. Cl. ..... 92/186; 123/193.6; 92/238
(58) Field of Search ..... 92/176, 181 R, 92/186, 209, 214, 238; 123/193.6

(56) References Cited

U.S. PATENT DOCUMENTS

| | | | | |
|---|---|---|---|---|
| 2,244,008 | | 6/1941 | Hazen et al. . | |
| 3,189,010 | * | 6/1965 | Isley | 92/186 X |
| 3,319,536 | | 5/1967 | Kohl et al. . | |
| 3,349,672 | | 10/1967 | Meier et al. | 92/231 |
| 3,354,793 | | 11/1967 | Meier et al. | 92/231 |
| 4,011,797 | | 3/1977 | Cornet | 92/186 |
| 4,083,292 | * | 4/1978 | Goloff | 92/176 |
| 4,517,930 | | 5/1985 | Nakano et al. . | |
| 4,581,983 | | 4/1986 | Moebus | 92/186 |
| 4,662,319 | * | 5/1987 | Ayoul | 92/186 X |
| 4,727,795 | | 3/1988 | Murray et al. . | |
| 4,838,149 | | 6/1989 | Donnison et al. . | |
| 5,040,454 | | 8/1991 | Ballheimer et al. . | |
| 5,052,280 | * | 10/1991 | Kopf et al. | 92/186 |
| 5,778,846 | | 7/1998 | Mielke | 123/193.6 |
| 6,026,777 | * | 2/2000 | Kemnitz et al. | 123/193.6 |
| 6,155,157 | * | 12/2000 | Jarrett | 92/186 |

* cited by examiner

*Primary Examiner*—John E. Ryznic
(74) *Attorney, Agent, or Firm*—Alan J. Hickman

(57) ABSTRACT

A compact one piece piston for use in an internal combustion engine has a compression height ("CH") of between 55 percent and 70 percent the piston diameter ("D") and a closed piston cooling gallery defined by a piston ring belt welded at spaced locations to a piston body and to a flange portion of the piston body. The flange portion supports a second end of the piston ring belt and resists deflection of the piston ring belt. The closed piston cooling gallery is configured to promote heat transfer and piston cooling by facilitating shaking of a cooling fluid located within the closed piston cooling gallery during reciprocal piston movement. A piston skirt extending from the flange provides additional strength and rigidity.

15 Claims, 3 Drawing Sheets

COMPACT ONE PIECE COOLED PISTON AND METHOD

TECHNICAL FIELD

This invention relates generally to a piston for an internal combustion engine and more particularly to a one piece welded closed cooling gallery piston having a compact compression height and a method of producing such a piston.

BACKGROUND ART

An efficient, light weight, compact, increased horsepower internal combustion engine is sought after by those involved in the industry. To achieve this it is necessary to push the engine design toward its mechanical limits. Increasing combustion pressures in the combustion chamber requires higher combustion temperatures, faster piston speeds and increased mechanical forces. As a result, the piston and associated components are placed under greater stress.

In order to perform satisfactorily and live in such an environment it is necessary to provide a piston that has improved cooling capabilities, increased strength, and a short compression height for reduced mass and light weight. It is also important that such a piston is easy to manufacture with a high level of quality.

It is known to provide a piston with a closed piston cooling gallery. An example of this is shown in U.S. Pat. No. 4,581,983, dated Apr. 15, 1986, to Horst Moebus. The closed piston cooling gallery of Moebus is provided by welding a top portion of the piston to a bottom portion of the piston along a planar surface. The top and bottom portions of the piston each have a portion of the cooling gallery disposed therein. This piston has an excessively tall compression height making it heavy and unsuitable for high speed operation. This piston is also difficult to manufacture and does not have the strength to withstand the increased stresses of the higher combustion pressures. The closed piston cooling gallery as configured in Moebus does not provide a height sufficient to permit adequate shaking of the cooling fluid within the closed piston cooling gallery. Therefore, the efficiency of cooling of the piston is inadequate.

It is also known to provide a piston with decreased mass by reducing height. An example of this is shown in U.S. Pat. No. 4,727,795, dated Mar. 1, 1988, to Edward J. Murray. The short piston height is achieved by intersecting the ring band with the pin bores. This ring band intersection is unacceptable in a high piston speed engine, as leakage and wear in the region of the ring band would be excessive. Additionally, such a piston would not survive the high piston speeds because of insufficient cooling of the piston top portion. Further, the piston skirt, when welded to the piston top, does not permit removal of a pin in the pin bore and therefore makes assembly difficult and would not be a suitable choice. Additionally, providing a piston skirt that is removably attached to the piston reduces strength and further restrict the possibility of use in the proposed high speed, high temperature and high combustion pressure environment.

U.S. Pat. No. 5,78,846, dated Jul. 14, 1998, to Siegfried Mielke discloses a forged or cast piston head of an articulated (two piece) piston. The ring band of the piston is welded to a top portion of the piston. Because this piston does not have a closed cooling gallery or a supported ring band it would not be suitable for use in a high piston speed, high temperature and high compression pressure environment. The higher forces applied to the piston would cause the unsupported ring band to deflect. This would result in unacceptable blowby leakage and premature stress failure of the piston. Further, the piston cooling would be inadequate and would result in a thermal related structural failure of the piston.

The present invention is directed to overcoming one or more of the problems set forth above.

DISCLOSURE OF THE INVENTION

In one aspect of the present invention a compact one piece piston with a piston body having a top surface and a longitudinal axis is provided. A support portion extending in a direction longitudinally from the piston body defines a pair of spaced apart pin bosses. The pin bosses have a pin bore and a pin bore axis oriented transverse the longitudinal axis. The pin bore axis is spaced from the top surface a preselected compression height distance "CH". A flange portion extends in a direction radially from the piston body at a preselected location between the top surface and the pin bore. A piston ring belt portion having a preselected diameter "D" is disposed about the piston body. The piston ring belt portion is connected to the piston body and to the flange portion by welding. The piston body, flange portion and ring belt portion define a closed piston cooling gallery. The compression height distance "CH" is within a magnitude of between 55 percent and 70 percent the magnitude of diameter "D".

In another aspect of the present invention, a method of producing a compact one piece piston having a top surface and a longitudinal axis is provided. The method includes the step of forging a one piece piston body having a head portion, a flange portion, and a support portion. The flange and support portions are connected to the head portion. The head portion has a top surface and the support portion has a pin bore axis spaced a preselected compression height distance "CH" from the top surface. The method further includes the steps of providing a cooling gallery disposed annularly about the piston body, and connecting a piston ring belt portion to the piston body and closing off the cooling gallery. The ring belt has a preselected diameter "D" and the compression height distance "CH" being within a magnitude of between 55 percent and 70 percent the magnitude of the diameter "D".

BEST MODE FOR CARRYING OUT THE INVENTION

Figure 1:
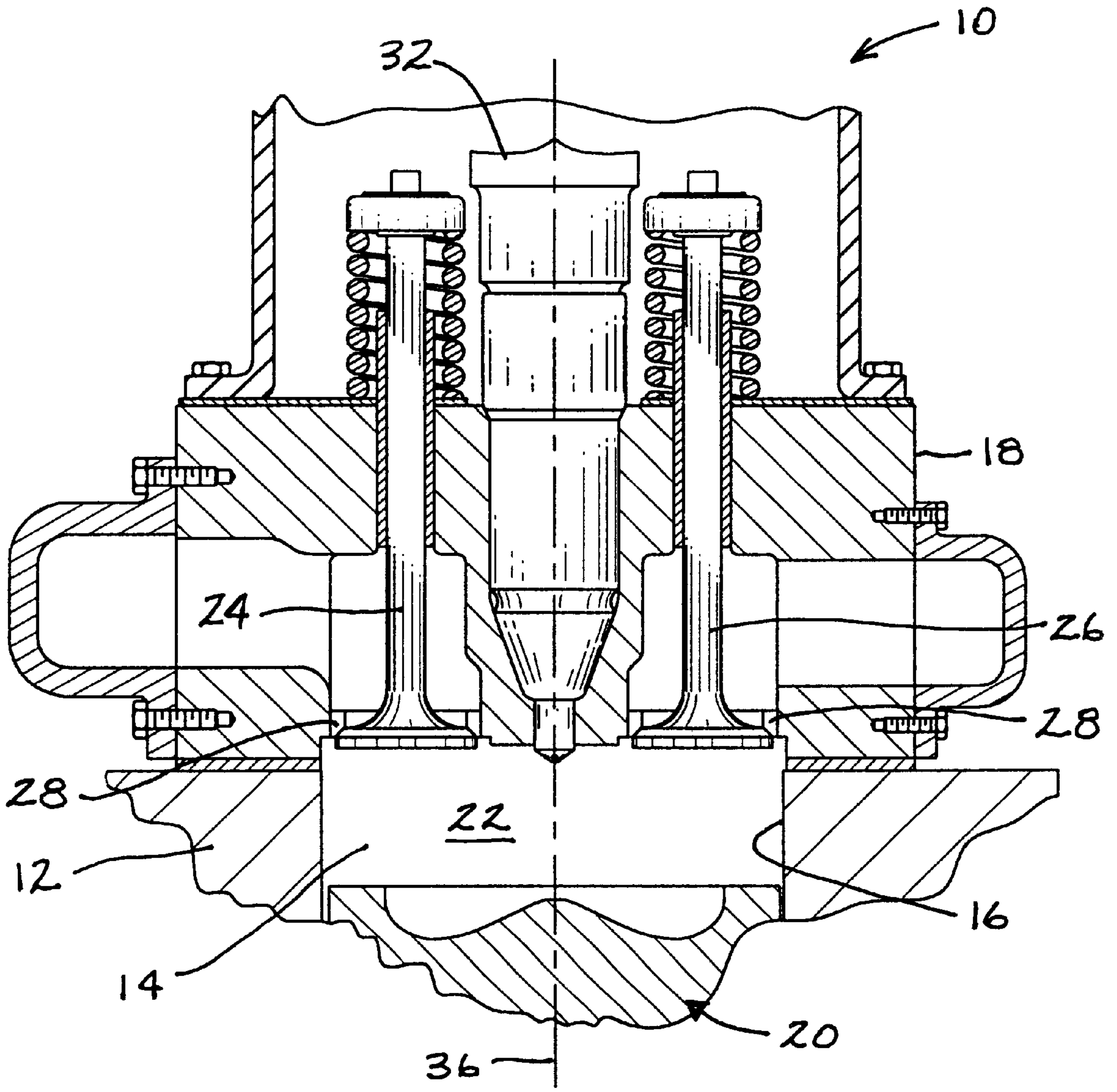
FIG. 1 is a diagrammatic sectional view of a portion of an internal combustion engine and an embodiment of a compact one piece piston of the present invention.
Figure 2:
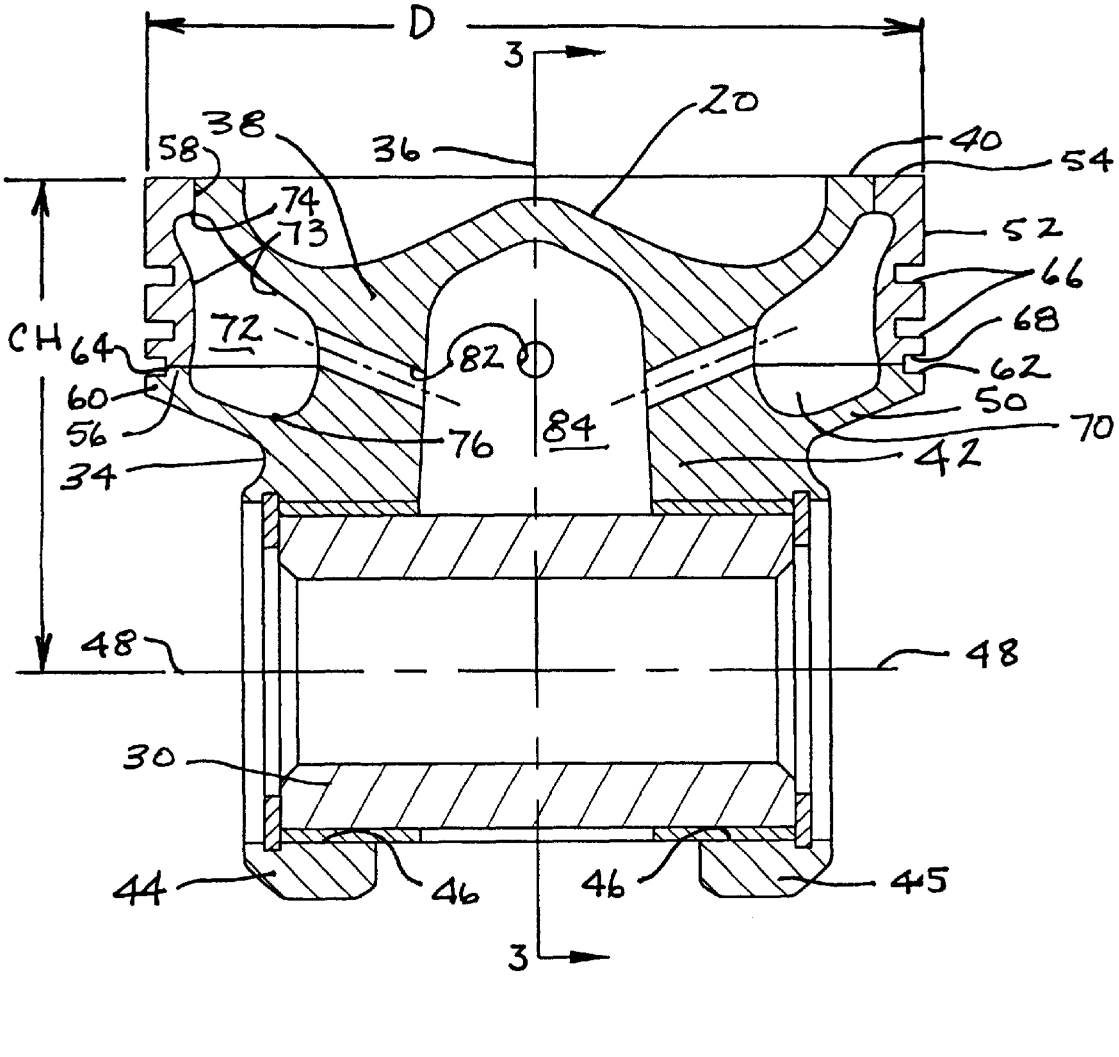
FIG. 2 is a diagrammatic enlarged sectional view of the compact one piece piston of FIG. 1.
Figure 3:
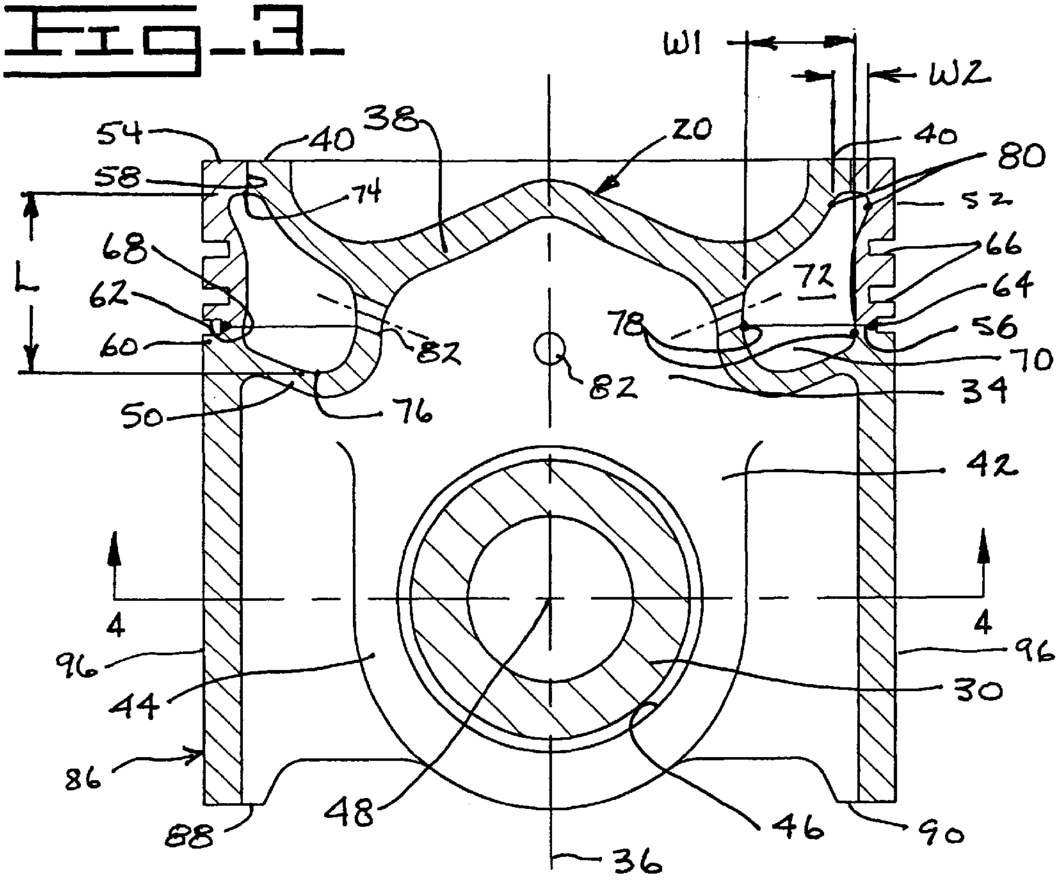
FIG. 3 is a diagrammatic sectional view taken along lines 3—3 of FIG. 2.
Figure 4:
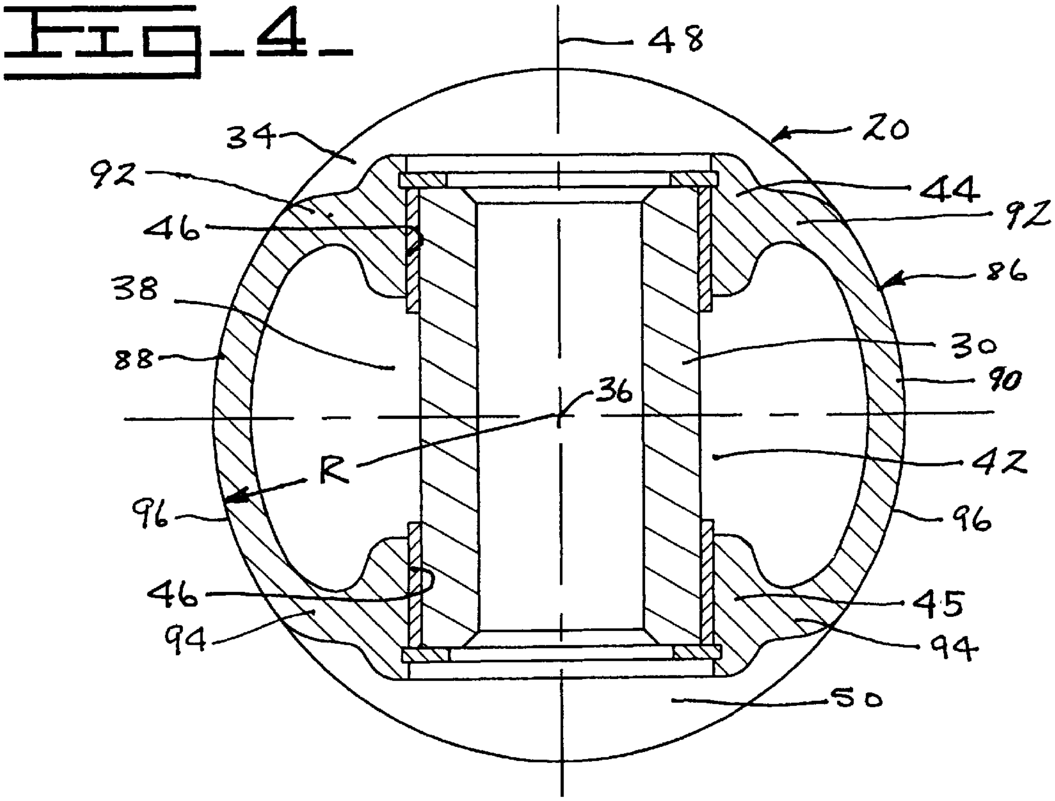
FIG. 4 is a diagrammatic sectional view taken along lines 4—4 of FIG. 3.

With reference to the drawings and particularly FIG. 1, a partial view of an internal combustion engine 10 is shown. The engine 10 has an engine block 12, at least one cylinder 14 having a cylinder bore 16 in the engine block 12, at least one cylinder head 18 mounted on the engine block 12 in a conventional manner, and a compact one piece piston 20 disposed in the cylinder bore 16 and reciprocally movable in the cylinder bore 16 between bottom and top dead center positions. The compact one piece piston 20, cylinder head 18, and cylinder bore 16 define a combustion chamber 22 therein. At least one intake valve 24 and one exhaust valve 26 are disposed in the cylinder head 18 and movable between open and closed positions relative to valve seats 28 disposed in the cylinder head 18 to pass gasses to and from the combustion chamber 22 in a conventional manner. A connecting rod (not shown) is pivotally connected to the compact one piece piston 20 in a conventional manner, such as, by a wrist pin 30 (FIGS. 2–4). A fuel system, of any suitable and conventional design, for example, a fuel injection system having a fuel injector 32, communicates fuel to the combustion chamber 22.

As best seen in FIGS. 2–4, the compact one piece piston 20 is constructed in a manner to provide increased strength, light weight and improved cooling capabilities over other piston designs. The compact one piece piston 20 has a piston body 34 and a longitudinal axis 36. The piston body 34 has a head portion 38 and a top surface 40. As known in the art, a compact one piece piston is different in construction than an articulated piston, sometimes referred to as a two piece piston. An articulated piston has, in addition to other differences, a piston skirt that is pivotally connected to the wrist pin and free from connection to the piston body. This invention is not suited for use with articulated pistons.

A support portion 42 of the compact one piece piston 20 extends in a direction longitudinally from the head portion 38. A first pin boss 44 and a second pin boss 45 connected to the support portion. The first and second pin bosses 44,45 are spaced apart and each have a pin bore 46. The pin bores 46,46 each have a pin bore axis 48 and are axially aligned with each other. The pin bore axes 48 are oriented transverse the longitudinal axis 36 of the compact one piece piston 20. The pin bore axes 48 are spaced from the top surface a preselected compression height distance "CH".

A flange portion 50 is connected to the head portion 38 of the piston body 34 at a preselected location between the top surface 40 and the pin bore 46 and extends in a direction radially from and about the piston body 34.

A piston ring belt portion 52 having a preselected diameter "D" is disposed about the piston body 34. The piston ring belt portion 52 is connected to the head portion 38 and to the flange portion 50 of the piston body 34 by welding, for example, laser, electron beam or any other suitable welding process. In particular, the piston ring belt portion 52 has first and second spaced apart ends 54,56 and an inside surface 58. The inside surface 58 is welded to the head portion 38 of the piston body 34 and the second end 56 is welded to the flange portion 50 of the piston body 34. The strength of the compact one piece piston 20 is increased by supporting the piston ring belt portion 52 with the a flange portion 50.

The flange portion 50 has a ring end portion 60. The ring end portion 60 defines a first side 62 of a first piston ring groove 64 of a plurality of piston ring grooves 66. The piston ring belt portion 52 defines a second side 68 of the first piston ring groove 64. The first and second sides 62,68 are spaced a preselected distance apart. The welding connecting the flange portion 50 to the second end of the piston ring belt portion 52 is preferably at a location between the first and second sides 62,68 of the first piston ring groove 64.

The compression height distance "CH" of the compact one piece piston is within a magnitude of between 55 percent and 70 percent the magnitude of diameter "D". This ratio of "CH" to "D" defines a reduced mass short compression height piston.

A piston cooling gallery 70 is disposed annularly in the head portion 38 of the piston body 34. The piston cooling gallery 70 is closed by the flange portion 50 and piston ring belt portion 52 to define a closed piston cooling gallery 72 with the piston body 34 of the compact one piece piston 20. The closed piston cooling gallery 72 has first and second spaced apart extreme end surface locations 74,76 defining a preselected longitudinal gallery length "L". The length "L" being of a magnitude sufficient to enable a substantial and adequate amount of space for the shaking of a cooling fluid contained within the closed piston cooling gallery 72 and thereby facilitate cooling of the piston ring belt portion 52 and piston body 34. The length "L" of the closed piston cooling gallery 72 is a function of the diameter "D" of the piston and within a range between 20 and 30 percent of the magnitude of the diameter "D.

The closed piston cooling gallery 72 has a pair of first spaced apart side surface locations 78 defining a first preselected gallery width "W1". The closed piston cooling gallery width "W1" is smaller in magnitude than the closed piston cooling gallery length "L". The closed piston cooling gallery 72 also has a pair of second spaced apart side surface locations 80 which are spaced from said pair of first spaced apart side surface locations 72 and which define a second preselected closed piston cooling gallery width "W2". The second closed piston cooling gallery width "W2" is smaller in magnitude than the first piston cooling gallery width "Wi". The predetermined proportion between "W1", "W2" and "L" is based on fluid dynamics. It is to be noted that, the top surface 40 and the first end 54 is located closer to the pair of second spaced apart side surface locations 80 than to the first pair of spaced apart side surface locations 78. This predetermined proportion and relationship provides adequate fluid shaking within the closed piston cooling gallery 72 and optimizes cooling of the compact one piece piston 20.

The compact one piece piston has a plurality of spaced apart cooling fluid passing passageways 82 disposed radially in the head portion 38 of the piston body 34. The cooling fluid passing passageways 82 open into the piston cooling gallery 70 and into a recess 84 located centrally in the head portion 38 of the piston body 34. The cooling fluid passing passageways 82 provide for the passing of cooling fluid between the closed piston cooling gallery 72 and the recess 84. The cooling fluid passing passageways 82 are preferably machined radially inwardly into the piston body 34 prior to welding of the piston ring belt portion 52 to the piston body 34.

The plurality of spaced apart piston ring grooves 66 are disposed in the piston ring belt portion. The piston ring grooves 66 are radially spaced from the longitudinal axis 36 and axially spaced relative to the longitudinal axis 36 between the first and second extreme end surface locations 74,76 of the closed piston cooling gallery 72. It is to be noted that the size, proportions and location of the closed piston cooling gallery 72, as heretofore described, provides improved effective piston cooling capabilities allowing for operation in applications having higher internal combustion engine 10 pressures, temperatures and piston speed.

A piston skirt 86 has first and second skirt portions 88,90. The first skirt portion 88 is spaced from and opposite the second skirt portion 90. The first and second skirt portions 88,90 are each connected to the flange portion 50 and the support portion 42. The piston skirt 86 extends from the flange portion in a substantially axial direction relative to the longitudinal axis 36 to a location past the pin bore axis 48. The piston skirt being connected to the flange portion provides support to the flange portion and resists deflection thereof.

The first and second skirt portions 88,90 each have first and second spaced end portions 92,94. Each of the first and second skirt portions 88,90 extend between the first and second pin bosses 44,45 and are connected at the first end portion 92 to the first pin boss 44 and at the second end portion 94 to the second pin boss 45. The piston skirt 86 being connected to the piston ring belt portion 52, and as described, provides for additional stiffness and reduces the potential for undesirable deflection of the piston skirt 86 and the piston ring belt portion 52.

The first and second skirt portions 88,90 each have an outer surface 96 defined by a radius "R" generated about the longitudinal axis 36. The curved shape provides additional piston skirt 86 strength and also conforms to provide clearance between the piston skirt 86 and the cylinder bore 16.

The head portion 38, the support portion 42 and the flange portion 50 of the piston body 34, and the piston skirt 86 are forged in one piece from any suitable steel material capable of withstanding the high combustion pressure, high piston speed, high temperatures and increased mechanical stress.

A method of producing the compact one piece piston 20 includes the step of forging a unitary compact one piece piston body 34. In the instant step, the head portion 38, the flange portion 50, and the support portion 42 are forged to provide a compact one piece piston body 34. The cooling gallery 70 is provided annularly about the head portion 38 of the piston body 34 by forging, machining or any other suitable manufacturing process. The piston ring belt portion 52 is positioned about the piston body 34 and is connected to the piston body 34 by welding to close off the piston cooling gallery 70 and form the closed piston cooling gallery 72.

Prior to the welding of the piston ring belt portion 52 to the piston body 34, the plurality of spaced apart cooling fluid passing passageways 82 are machined radially inwardly in the piston body 34 from an outward location and in a direction toward the longitudinal axis 36.

Preferably, the inside surface 58 of the piston ring belt portion 52 is welded to the piston body 34 and the second end 56 of the piston ring belt portion 52 is welded to the flange portion 50. The plurality of axially spaced apart piston ring grooves 66 are machined in the piston ring belt portion 52 subsequent to the welding of the piston ring belt portion 52 to the piston body 34. The closed piston skirt 86 is preferably formed at the same time the piston body 34 is being forged.

INDUSTRIAL APPLICABILITY

With reference to the drawings, the compact one piece piston 20 of the instant invention is manufactured by the method as set forth above to provide a light weight, high strength, cooled piston that is suitable for use in a high combustion pressure, high piston speed, high temperature and high mechanical stress environment. The compact one piece piston 20 as constructed enables the combustion pressures in the combustion chamber to be increased and thereby supports a maximization of the power output of the internal combustion engine for a given engine size.

The operation of the compact one piece piston 20 in the internal combustion engine 10 can best be seen in FIG. 1. With the intake and exhaust valves 24,26 closed, combustion of an air/fuel mixture in the combustion chamber 22 by auto ignition, spark ignition or a combination thereof causes the gases to expand and to force movement of the compact one piece piston downward and away from the cylinder head 18 within the cylinder bore 16. This linear movement is transformed by way of the connecting rod and the crankshaft into rotary crankshaft motion, the output of which is used to provide mechanical energy to power, for example, a stationary machine, an electrical generator, a mobile machine and a ship. The intake and exhaust valves 24,26 are opened and closed at suitable times during an engine cycle to pass intake air and exhaust gasses relative to the combustion chamber 22. Such operation is well known by those skilled in the art and will not be discussed in any greater detail.

The closed piston cooling gallery 72 receives directed cooling fluid from within the engine sump (not shown). The cooling fluid within the closed piston cooling gallery 72 is shaken by the dynamics of movement of the compact one piece piston 20. This shaking, which is enhanced by the shape and proportions of the closed piston cooling gallery causes the fluid within the closed piston cooling gallery to agitate and contact the internal surface 73 of the closed piston cooling gallery 72 and remove heat at the surface 72. The location of the closed piston cooling gallery 72 relative to the piston top surface 40 and the piston ring belt portion 52 maximizes heat transfer from these critical locations and enables the compact one piece piston 20 to perform satisfactorily at the required higher operating temperatures. The cooling fluid passing passageways 82 allow cooling fluid to exit the closed piston cooling gallery 72 and be replenished by replacement cooling fluid entering the closed piston cooling gallery 72 at another location. This further facilitates heat transfer and piston life.

The strength of the compact one piece piston 20 is enhanced by the support provided to the piston ring belt portion 52 by the flange portion 50. The flange portion 50, being connected as described above to the piston ring belt portion 52, supports the second end 56 of the piston ring belt portion 52 and the reduces the potential for deflection of the piston ring belt portion 52 during operation of the internal combustion engine 10. As a result, the high forces acting on the piston ring belt portion 52 operation of the internal combustion engine 10 will be resisted and stress related premature failures will be prevented.

The compact one piece piston 20 being compact and having the aforementioned "CH" to "D" proportions reduces the mass of the compact one piece piston 20 and facilitates internal combustion engine 10 operation at higher piston speeds. This is particularly important in internal combustion engine 10 where the horsepower to weight ratio and/or internal combustion engine 10 size is critical.

The strength of the compact one piece piston 20 is also enhanced by the piston skirt 86. The piston skirt 86 is closed, absent a gap between the piston body 34 and the skirt 86, and connected, as discussed above, to the flange portion 50 and to the support portion 42. This further increases the rigidity of the piston skirt 86, the flange portion 50, and the piston ring belt portion 52. As a result, the forces exhibited during operation of the internal combustion engine 10 are resisted and deflection, cracking and the like of the piston skirt 86, the flange portion 50, and the piston ring belt portion 52 are prevented.

The piston body 34 being forged as a unitary structure and the piston ring belt portion 52 being welded to the piston body 34 to complete the compact one piece piston 20 results in a robust compact one piece piston 20 capable of withstanding the forces applied during combustion cycles of the internal combustion engine 10.

Other aspects, objects and advantages of this invention can be obtained from a study of the drawings, the disclosure and the appended claims.

What is claimed is:

1. A compact one piece piston, comprising:

a piston body having a top surface and a longitudinal axis;

a support portion extending in a direction longitudinally from said piston body and defining a pair of spaced apart pin bosses, said pin bosses having a pin bore and a pin bore axis oriented transverse the longitudinal axis, said pin bore axis being spaced from said top surface a preselected compression height distance "CH";

a flange portion extending in a direction radially from said piston body at a preselected location between the top surface and the pin bore;

a piston ring belt portion having a preselected diameter "D" and being disposed about said piston body, said piston ring belt portion being connected to said piston body and to said flange portion by welding, said piston body, flange portion and ring belt portion defining a closed piston cooling gallery, said compression height distance "CH" being within a magnitude of between 55 percent and 70 percent the magnitude of diameter "D".

2. The compact one piece piston, as set forth in claim 1, wherein said closed piston cooling gallery having first and second spaced apart extreme end locations defining a preselected longitudinal gallery length "L", said length being of a magnitude sufficient to enable substantial shaking of a cooling fluid contained within the closed piston cooling gallery.

3. The compact one piece piston, as set forth in claim 2, wherein the length "L" of the closed piston cooling gallery being a function of the diameter "D" of the piston and within a range between 20 and 30 percent of the magnitude of the diameter "D".

4. The compact one piece piston, as set forth in claim 2, wherein said piston ring belt portion having a plurality of spaced apart piston ring grooves disposed therein, said piston ring grooves being spaced axially relative to the longitudinal axis between the first and second extreme end locations of the closed piston cooling gallery.

5. The compact one piece piston, as set forth in claim 4, wherein said piston ring belt portion having first and second ends and an inside surface, said inside surface being welded to the piston body and said second end being welded to the flange portion.

6. The compact one piece piston, as set forth in claim 5, wherein said flange portion having a ring end portion, said ring end portion including a first side of a first piston ring groove of said plurality of piston ring grooves and said piston ring belt portion defining a second side of the first piston ring groove, said first and second sides being spaced a preselected distance apart, said welding connecting the flange portion to the second end of the piston ring belt portion being at a location between the first and second sides of the first piston ring groove.

7. The compact one piece piston, as set forth in claim 4, including a piston skirt having first and second spaced apart opposite skirt portions, said first and second skirt portions each being connected to the flange portion and the support portion.

8. The compact one piece piston, as set forth in claim 7, wherein said piston skirt extending from the flange portion in an axial direction relative to the longitudinal axis to a location past the pin bore axis.

9. The compact one piece piston, as set forth in claim 7, wherein said first and second skirt portions each are connected to the first and second spaced apart pin bosses.

10. The compact one piece piston, as set forth in claim 7, wherein said piston body, said support portion, said flange portion, and said piston skirt being forged in one piece from a steel material.

11. A method of producing a compact one piece piston having a top surface and a longitudinal axis; comprising the steps of:

forging a one piece piston body having a head portion, a flange portion arranged in a substantially radial direction, and a support portion, said flange and support portions being connected to the head portion, said head portion having a top surface and said support portion having a pin bore axis spaced a preselected compression height distance "CH" from the top surface;

providing a cooling gallery disposed annularly about the piston body; and connecting a piston ring belt portion to the piston body and closing off the cooling gallery, said ring belt having a preselected diameter "D" and said compression height distance "CH" being within a magnitude of between 55 percent and 70 percent the magnitude of diameter "D".

12. The method, as set forth in claim 11, wherein the step of connecting the piston ring belt portion to the piston body includes the steps of:

welding an inside surface of the piston ring belt portion to the piston body; and welding a second end of the piston ring belt to the flange portion.

13. The method, as set forth in claim 12, including the step of machining a plurality of axially spaced apart piston ring grooves in the piston ring belt.

14. The method, as set forth in claim 11, including the step of providing a forged piston skirt on the piston body, said piston skirt being connected to the flange portion and the support portion of the piston body.

15. A compact one piece piston for an internal combustion engine, comprising:

a cylinder having a cylinder bore disposed therein, said compact one piece piston being disposed in the cylinder bore and being adapted to reciprocally move in said cylinder bore, said compact one piece piston including:

a piston body having a top surface and a longitudinal axis;

a support portion extending in a direction longitudinally from said piston body and defining a pair of spaced apart pin bosses, said pin bosses having a pin bore and a pin bore axis oriented transverse the longitudinal axis, said pin bore axis being spaced from said top surface a preselected compression height distance "CH";

a flange portion extending in a direction radially from said piston body at a preselected location between the top surface and the pin bore;

a piston ring belt portion having a preselected diameter "D" and being disposed about said piston body, said piston ring belt portion being connected to said piston body and to said flange portion by welding, said piston body, flange portion and ring belt portion defining a closed piston cooling gallery, said compression height distance "CH" being within a magnitude of between 55 percent and 70 percent the magnitude of the preselected diameter "D";

said closed piston cooling gallery having first and second spaced apart extreme end locations defining a preselected longitudinal gallery length "L", said length being of a magnitude sufficient to enable substantial shaking of a cooling fluid contained within the closed piston cooling gallery;

said piston ring belt portion having a plurality of spaced apart piston ring grooves disposed therein, said piston grooves being spaced axially relative to the longitudinal axis between the first and second extreme end locations of the closed piston cooling gallery; and said piston ring belt portion having first and second ends and an inside surface, said inside surface being connected to the piston body by welding and said second end being connected to the flange portion by welding.

* * * * *